(12) United States Patent
Garrick et al.

(10) Patent No.: US 7,575,401 B1
(45) Date of Patent: Aug. 18, 2009

(54) PCD DRILL FOR COMPOSITE MATERIALS

(75) Inventors: Richard M. Garrick, Woodland Hills, UT (US); John A. Bunting, Provo, UT (US)

(73) Assignee: Precorp, Inc., Spanish Fork, UT (US)

( * ) Notice: Subject to any disclaimer, the term of this patent is extended or adjusted under 35 U.S.C. 154(b) by 323 days.

(21) Appl. No.: 10/992,434

(22) Filed: Nov. 18, 2004

(51) Int. Cl.
B23B 51/02 (2006.01)
(52) U.S. Cl. .................. 408/145; 408/224; 408/230
(58) Field of Classification Search .............. 408/145, 408/223, 224, 227, 230, 56, 57, 225, 144; 409/135, 136; B23B 51/00, 51/02
See application file for complete search history.

(56) References Cited

U.S. PATENT DOCUMENTS

| | | | | |
|---|---|---|---|---|
| 1,747,117 A | * | 2/1930 | Klein | 76/108.6 |
| 2,332,295 A | * | 10/1943 | Bouchal | 408/211 |
| 3,346,894 A | * | 10/1967 | Lemelson | 408/12 |
| 3,387,511 A | * | 6/1968 | Ackart, Sr. et al. | 408/230 |
| 3,779,664 A | * | 12/1973 | Caley et al. | 408/225 |
| 4,093,395 A | | 6/1978 | Luebbert et al. | |
| 4,480,952 A | | 11/1984 | Jeremias | |
| 4,527,643 A | * | 7/1985 | Horton et al. | 175/420.2 |
| 4,529,341 A | | 7/1985 | Greene | |
| 4,627,503 A | | 12/1986 | Horton | |
| 4,713,286 A | | 12/1987 | Bunting et al. | |
| 4,720,218 A | | 1/1988 | DeFries et al. | |
| 4,762,445 A | | 8/1988 | Bunting et al. | |
| 4,898,503 A | * | 2/1990 | Barish | 408/230 |
| 5,173,014 A | * | 12/1992 | Agapiou et al. | 408/59 |
| 5,195,403 A | * | 3/1993 | Sani et al. | 76/108.6 |
| 5,197,233 A | | 3/1993 | Wiand | |
| 5,217,332 A | * | 6/1993 | Takasaki et al. | 408/145 |
| 5,273,380 A | | 12/1993 | Musacchia | |
| 5,354,155 A | | 10/1994 | Adams | |
| 5,443,337 A | * | 8/1995 | Katayama | 408/145 |
| 5,611,251 A | | 3/1997 | Katayama | |
| 5,641,252 A | | 6/1997 | Eriksson et al. | |
| 5,649,796 A | | 7/1997 | Durney | |
| 5,816,755 A | | 10/1998 | Thelin | |
| 5,931,615 A | | 8/1999 | Wiker | |
| 6,029,544 A | * | 2/2000 | Katayama | 76/108.6 |
| 6,030,156 A | | 2/2000 | Andronica | |
| 6,126,367 A | * | 10/2000 | Reed | 408/1 R |
| 6,132,148 A | | 10/2000 | Thompson | |
| 6,315,504 B1 | * | 11/2001 | Sekiguchi et al. | 408/144 |

(Continued)

FOREIGN PATENT DOCUMENTS

EP 137898 A1 * 4/1985

(Continued)

*Primary Examiner*—Daniel W Howell
(74) *Attorney, Agent, or Firm*—Madson IP, P.C.

(57) ABSTRACT

A PCD drill for producing close tolerance holes in multi layer laminates, such as carbon fiber reinforced composites, with minimum fraying of the fibers on both entrance and exit from the hole is provided. The drills provided include a symmetrical cutting point with a self-centering split point and a high shear second cutting lip positioned at the outer diameter of the drill. The drills of the invention may allow for increased cutting speeds and feeds when used with such advanced composite materials, thus increasing tool productivity and providing increased performance.

36 Claims, 9 Drawing Sheets

U.S. PATENT DOCUMENTS

| | | | |
|---|---|---|---|
| 6,923,602 B2 * | 8/2005 | Osawa et al. | 408/230 |
| 7,367,758 B2 * | 5/2008 | Turrini et al. | 408/230 |
| 2003/0202853 A1 * | 10/2003 | Ko et al. | 408/225 |
| 2005/0135889 A1 * | 6/2005 | Turrini et al. | 408/230 |
| 2006/0269372 A1 * | 11/2006 | Goshima | 408/230 |

FOREIGN PATENT DOCUMENTS

| | | | |
|---|---|---|---|
| JP | 09057515 A * | 3/1997 | |
| JP | 2000061720 A * | 2/2000 | |
| JP | 2001341019 A * | 12/2001 | |
| JP | 2004017238 A * | 1/2004 | |
| JP | 2006192510 | 7/2006 | |
| JP | 2006192510 A * | 7/2006 | |
| WO | WO 2004082874 A1 * | 9/2004 | |

* cited by examiner

PCD DRILL FOR COMPOSITE MATERIALS

BACKGROUND OF THE INVENTION

Multi-layer laminates such as carbon fiber-reinforced composites (CFRP) and fiberglass composites (FRP) have become widely used in recent years in a large number of applications. These laminate materials most often consist of woven layers of strong fibers that are coated with resins and processed or cured to form a solid structure. Depending on the choice of the fibers and the resin systems used, these materials can be formulated and molded to produce components with excellent mechanical properties and unique geometries that would be difficult or impossible to obtain using other materials.

The properties of high strength CFRP materials may be widely varied by manipulating the characteristics of the matrix formulation, as well as the fiber type, content, orientation, build-up, and the methods used to shape these materials into a finished structure. This variability and the general strength of CFRP materials make them useful in a wide variety of applications, ranging from bicycle frames to aircraft components.

The reinforcing fiber most widely used in aircraft structures is a carbon fiber produced by the thermal decomposition of polyacrylonitrile (PAN). Such thermal decomposition converts the PAN fiber to a pure carbon fiber that is highly abrasive and very strong. In some specific examples, such carbon fibers are reported to have tensile strengths of about 800,000 psi and a modulus of about 40 million psi. In producing structures such as aircraft components, these high-strength fibers are first woven into thin sheets and combined with resins to form flat sheets of composite referred to as "prepregs." Components such as composite skin sections of aircraft may be produced by placing multiple layers of such prepregs in molds and then using pressure and heat to shape and cure them into a complex wing surface. Alternatively, components may be constructed by chopping carbon fibers into shorter lengths and blending them with resins to produce a compound suitable for use in compression molding or resin-transfer molding.

CFRP laminate parts have been used in the manufacture of aircraft for several years. In one example, the 777 aircraft manufactured by Boeing uses CFRP for the passenger cabin floor beams, for the vertical and horizontal tails, and for aerodynamic fairings. Overall, CFRP-based components make up about 9% of the structural weight of this aircraft.

Composite components such as aircraft parts are joined together or to other materials by fasteners. Processes used to join such components generally include the steps of drilling and countersinking a precision hole in the structures to be joined and then inserting a close-fitting fastener in a secure manner. Drilling of CFRP components is difficult, however, as a result of the highly abrasive nature of the material and its tendency to delaminate and fray when processed by conventional drills. One of the more serious problems experienced in drilling CFRP occurs when the exit of the drill from the hole produced leaves uncut fibers exposed in the hole. Such fibers can then interfere with the proper fit of the fastener used to join the materials.

Currently, the problem of holes produced in CFRP having frayed and uncut fibers is resolved by subjecting the affected CFRP component to a manual fiber removal/hole clearing process prior to component assembly. Forced inclusion of such a manual step prevents the use of automated systems capable of drilling and fastening components in a single operation. This may greatly increase the manufacturing time and costs of items constructed with CFRP components.

In addition to the above, it is understood in the art that the drilling speeds and feed rates used with conventional drills in conventional materials are unsuitable in CFRP-based components. Unlike aluminum materials used in the construction of aircraft, CFRP resin materials generally have a low melting point. As a result, machining operations used with CFRP products must not exceed an operating temperature of more than a few hundred degrees Farenheit. In such systems, keeping the cutting edge cool is made difficult by the low thermal conductivity of the resin matrix of the CFRP. While chips produced in the machining of aluminum carry away heat, cuttings produced by machining advanced composite materials such as CFRPs carry away very little of the heat generated by the machining process. As a result, heat buildup in the cutting zone is common. Such an accumulation of heat may cause the resin to oxidize and/or degrade, thus increasing risk of delamination and decreasing the quality and shape of the hole produced in the component and increasing the likelihood of uncut fibers.

In addition to the above, the widely different material properties of the fiber and resin matrix encapsulating the fibers in CFRP components also render machining of the product difficult. Specifically, even slight dulling of currently-used tool cutting edges can cause delamination of CFRPs and displacement of fibers from their positions in the resin matrix of the CFRP. Even modest cutting forces can cause delamination or leave residual stresses. Reduced drilling speeds and feed rates are thus currently used in CFRP product processing to reduce the occurrence of uncut fibers and delamination. This reduction in drilling speed further adds to the costs of machining composite laminate components.

Alternatives to drilling advanced composites are known in the art. Such alternatives generally include orbital milling processes that are capable of producing clean exit holes in components made of advanced composites such as CFRP. Such an approach requires highly specialized machinery, however. This machinery cannot be used in many of areas of aircraft assembly and takes considerably greater time to form each hole. As with the prior art drilling and post-processing methods discussed above, such orbital milling approaches may greatly inflate the cost and time of machining.

As a result, it would be an improvement in the art to provide drills and methods of their use to produce holes in advanced composite materials such as CFRP that require no additional processing, and thus, which may be used with combination drilling-and-fastening operations to increase the speed and efficiency of component assembly. It would be a further improvement in the art to provide such drills with polycrystalline diamond cutting surfaces to provide increased tool life and use with a broader range of materials. Similarly, it would be beneficial to provide such a drill capable of being refurbished to further extend tool life and reduce manufacturing costs. It would be further beneficial to provide combination drills with countersinks for use with such methods and materials. Such drills and methods of their use are provided herein.

BRIEF SUMMARY OF THE INVENTION

The apparatus and method of the present invention have been developed in response to the present state of the art, and in particular, in response to the problems and needs in the art that have not yet been fully solved by currently available drills and related hardware and methods used in drilling advanced composite materials such as CFRP. The drill configurations of the invention provide unique drills and combination drills and countersinks that can produce close tolerance precision holes in advanced composite laminates at high production rates with minimal delamination and high hole quality.

In some embodiments, the drills and combination drills with countersinks of the invention may include a polycrystalline diamond "PCD" cutting face to provide for longer tool life and extend the range of materials for which the drills and combination drills are suitable. Similarly, the unique drills or combination drills with countersinks of the invention may be constructed such that they may reconditioned, in some cases multiple times, thus allowing for more economical drilling costs.

In one embodiment of the invention, the drill comprises a helically-fluted cylindrical body with a symmetrically multi-faceted drill point. On the drill point, one set of symmetrical cutting edges located at the outer diameter of the drill provides a high shearing action at the peripheral edge of the drill to remove uncut fibers during drilling and during the exit of the drill from the hole. This embodiment may further include a set of more centrally-placed symmetrical cutting edges which form an obtuse angle that then intersects with the before-mentioned acute faceted cutting edges. In some embodiments, the very center of the drill may be formed into a very narrow point by the addition of two additional symmetrical cutting edges which may greatly reduce the cutting forces of the drill during use.

This unique drill point of the invention may also be produced with a second major diameter used to counterbore or countersink the hole produced by the drill point. In some situations, drilling and countersinking the hole in one operation may be preferred in order to achieve accurate placement of the countersink or counterbore and to save time in the manufacturing process.

The drills of the invention thus generally include an elongate drill body having at least one, and generally two helical flutes and a cutting tip. The cutting tip of the drill includes a center point positioned to be coaxial with a longitudinal axis of the drill body, a primary cutting lip extending from the center point toward an outer diameter of the drill body, and a shear cutting lip extending from the primary cutting lip to the outer diameter of the drill body. In the drills of the invention, the shear cutting lip is oriented at an angle of less than or equal to about 15° relative to the longitudinal axis of the drill body, thus presenting an included point angle of less than or equal to at least 30° when the drill has at least two flutes. In some specific embodiments, the shear cutting lip (or lips) is oriented at an angle of about 10° relative to the longitudinal axis of the drill body, providing an included point angle of 20°.

As mentioned briefly above, the drills of the invention may utilize a polycrystalline diamond cutting tip. In the drills of the invention, the helical flute may have a helix angle of from about 50 to about 45° relative to the longitudinal axis of the drill body. The helical flute may alternatively have a helix angle of 24° relative to the longitudinal axis of the drill body.

The drills of the invention may include a center point having a contact point at the surface of the drill where the longitudinal axis exits the drill body and a central cutting lip extending from the center point and intersecting with the primary cutting lip. In some configurations, the central cutting lip has an included angle very similar to that of the primary cutting lip. This included angle may also be influenced by a split angle of the central cutting lips. In some embodiments, the central cutting lip has a split angle of from about 130° to about 160°. In others, the split angle is 147°.

The primary cutting lip of the drills of the invention generally extends from the center point of the drill toward the outer diameter at an angle of from about 75° to about 45° relative to the longitudinal axis of the drill body, thus defining an included point angle of from about 90° to about 150°. In some specific embodiments, the primary cutting lip extends from the center point toward the outer diameter at an angle of about 59° (with an included angle of about 118°) relative to the longitudinal axis of the drill body.

The drills of the invention further include a shear cutting lip extending to the outer diameter of the drill body. Such shear cutting lips are oriented at an angle of from about 15° to about 10° relative to the longitudinal axis of the drill body, thus defining an included angle of less than about 30°. In some instances, the included angle is 20°. In specific embodiments of the drills of the invention, the shear cutting lip is oriented at an angle of about 10° relative to the longitudinal axis of the drill body. This provides shear cutting lips having a specific longitudinal length. In some embodiments of the present invention, the longitudinal length of the shear cutting lips is greater than or equal to about 0.020 inches.

The drills of the invention may further include a countersink or counterbore positioned on the helical flute to allow for countersinking or counterboring of the hole produced in a single operation.

In specific embodiments of the invention, the drills for producing holes in composite materials provided include an elongate drill body with a pair of symmetrical helical flutes and a polycrystalline diamond cutting tip. In such drills, the cutting tip may comprise a center point coaxial with a longitudinal axis of the drill body, a pair of primary cutting lips extending from the center point toward an outer diameter of the drill body, and a pair of symmetrical shear cutting lips oriented at an angle of less than or equal to about 15° relative to the longitudinal axis of the drill body.

In these drills the pair of symmetrical helical flutes may have a helix angle of from about 5° to about 45° relative to the longitudinal axis of the drill body. In specific embodiments, the pair of symmetrical helical flutes may have a helix angle of 24° relative to the longitudinal axis of the drill body.

The center point of the cutting tip of the drills of the invention generally includes a contact point that first touches the material to be drilled. In some embodiments, this contact point may be produced by the intersection of a pair of symmetrical central cutting lips that each extend from the center point to intersect with the primary cutting lips of the drill. In some configurations, the central cutting lip has an included angle very similar to that of the primary cutting lip. This included angle may also be influenced by a split angle of the central cutting lips. In some embodiments, the central cutting lip has a split angle of from about 130° to about 160°. In others, the split angle is 147°.

The pair of primary cutting lips of the drills of the invention generally extend from the center point toward the outer diameter at an angle of from about 45° to about 75° relative to the longitudinal axis of the drill body, thus defining an included central point angle of from about 90° to about 150°. In some specific embodiments of the invention, the pair of primary cutting lips extends from the center point toward the outer diameter at an angle of about 59° (with an included point angle of about 118°) relative to the longitudinal axis of the drill body.

The drills of the invention further provide a pair of symmetrical shear cutting lips is oriented at an angle of from about 15° to about 10° relative to the longitudinal axis of the drill body, thus defining an included angle of less than about 30°. In some embodiments, the included angle may be about 20°. In specific embodiments, the pair of symmetrical shear cutting lips may be oriented at an angle of about 10° relative to the longitudinal axis of the drill body. As noted above, this provides shear cutting lips having a specific longitudinal length. This longitudinal length is generally greater than or equal to about 0.020 inches.

As with the drills previously described, these drills having a pair of symmetrical helical flutes may further comprise a countersink or counterbore provided on at least one of the helical flutes. In some embodiments, the drill may have a countersink or counterbore provided on each of the helical flutes.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the twist drills of the present invention, as represented in FIGS. 1 through 9, is not intended to limit the scope of the invention, as claimed, but is merely representative of presently preferred embodiments of the invention.

The present invention provides an improved helical flute twist drill for drilling advanced composite laminates such as CFRP and fiberglass laminates. Some embodiments of the invention utilize a polycrystalline diamond (or "PCD") cutting edge with a tough tungsten carbide body. Such configurations may be produced using methods such as those disclosed in U.S. Pat. Nos. 4,713,286 and 4,762,445. PCD cutting edges are used in the art to provide a keen cutting edge that is resistant to wear when drilling strong, abrasive materials such as CFRP laminates. Other embodiments of the drills of the invention may be produced from tungsten carbide or other suitable materials known to one of ordinary skill in the art for use with less abrasive laminates such as fiberglass and still provide great benefit over the present art.

Other processes for manufacturing PCD drills such as those disclosed in U.S. Pat. Nos. 4,627,503; 5,611,251; and 6,132,148 are also suitable for use with the present invention. However, such approaches may not be preferred in specific circumstances due to limitations of the PCD drills produced using the braze attachment near the critical cutting structure or because of the limited area of PCD that is provided and the difficulty of forming the PCD drills made from these disclosures into the desired geometry.

Figure 1:
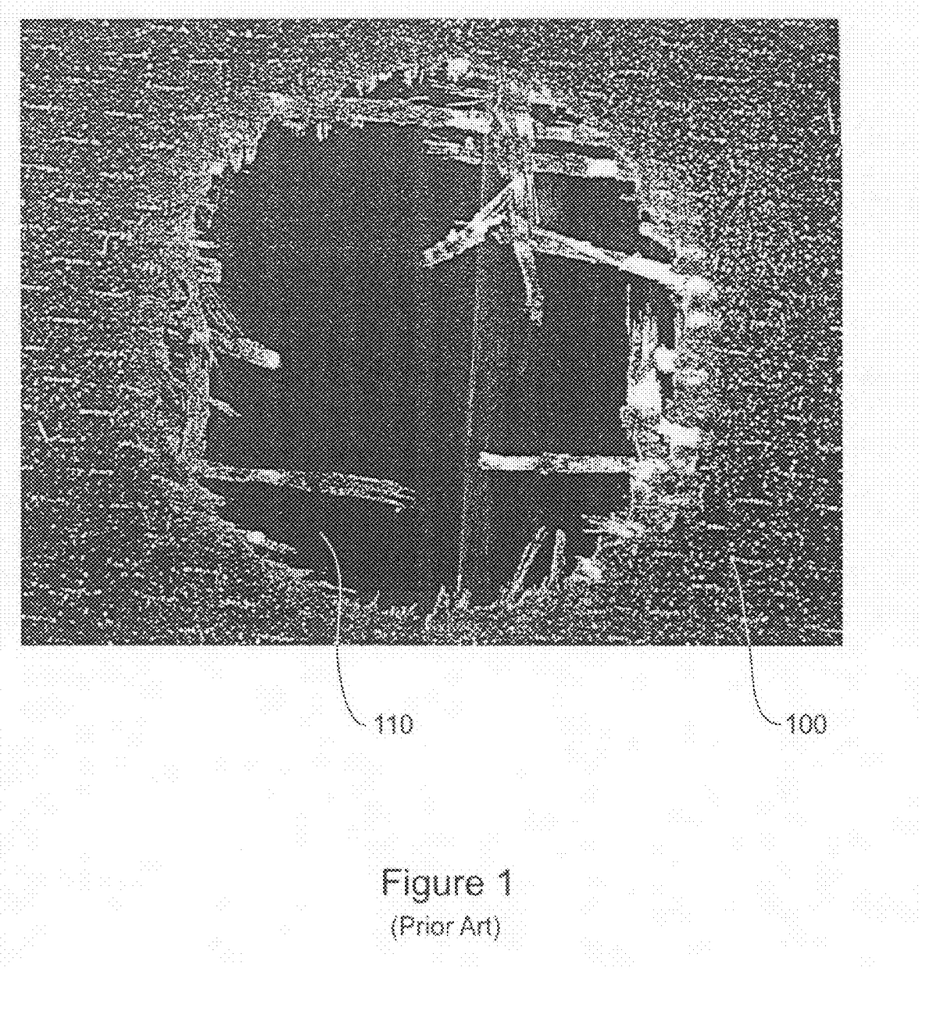
FIG. 1 is a photograph of a hole produced in a carbon fiber reinforced plastic composite laminate material using a PCD drill currently known in the art after previously producing 100 holes.

Referring first to FIG. 1, a portion of a panel of CFRP laminate 100 is shown in which an exit hole 110 was produced using a currently-known PCD drill (not shown). The drill used to produce the hole 110 had been previously used to produce 100 other holes to demonstrate the effect of wear on the performance of such tools. The hole 110 is shown to be characterized by rough edges and uncut fibers extending across the hole 110. As discussed above, such a hole 110 is unsuitable for immediate use in the assembly of components, and must undergo additional processing to remove the uncut fibers and improve the quality of the hole.

Figure 2:
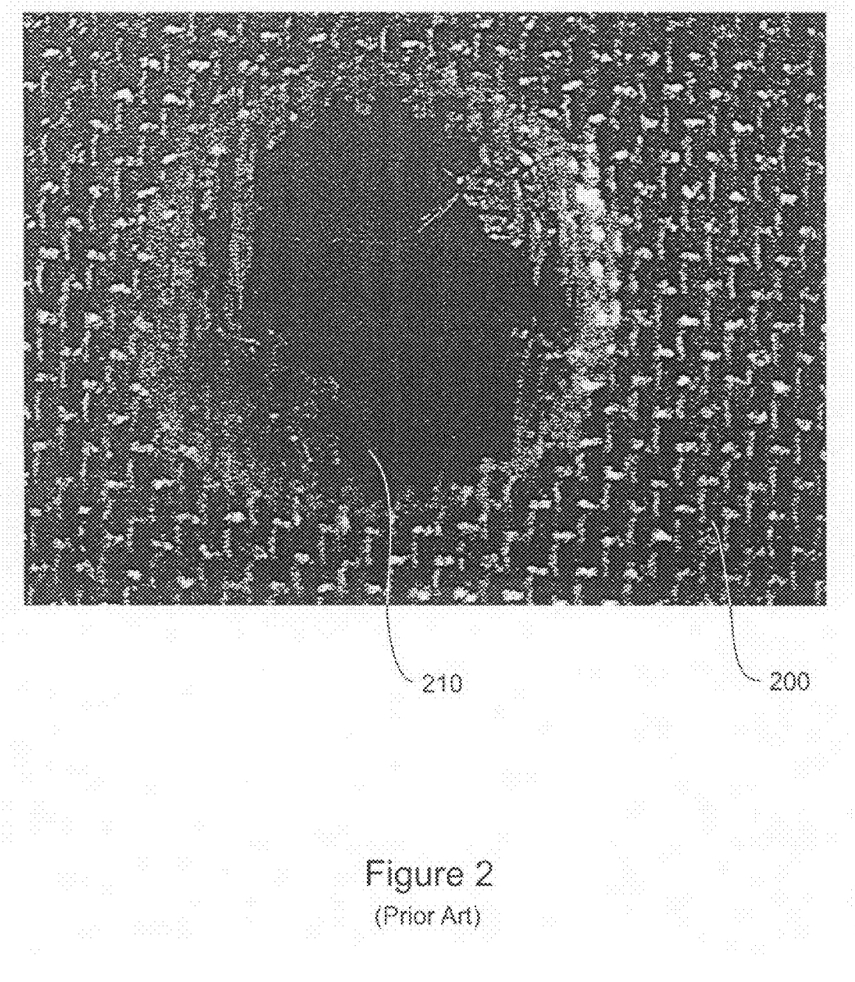
FIG. 2 is a photograph of a second hole produced in a carbon fiber reinforced plastic composite laminate material using a tungsten carbide drill of the type disclosed in U.S. Pat. No. 4,093,395 and known in the art after previously producing 10 holes.

FIG. 2 illustrates a hole 210 produced in a similar sheet of CFRP laminate 200 by a tungsten carbide drill of the type disclosed in U.S. Pat. No. 4,093,395 which had previously been used to make 10 other holes. As with the hole 110 of FIG. 1, the hole 210 of FIG. 2 also includes uncut fibers and an imperfect periphery characterized by individual fibers and masses projecting into the hole 210.

Figure 3:
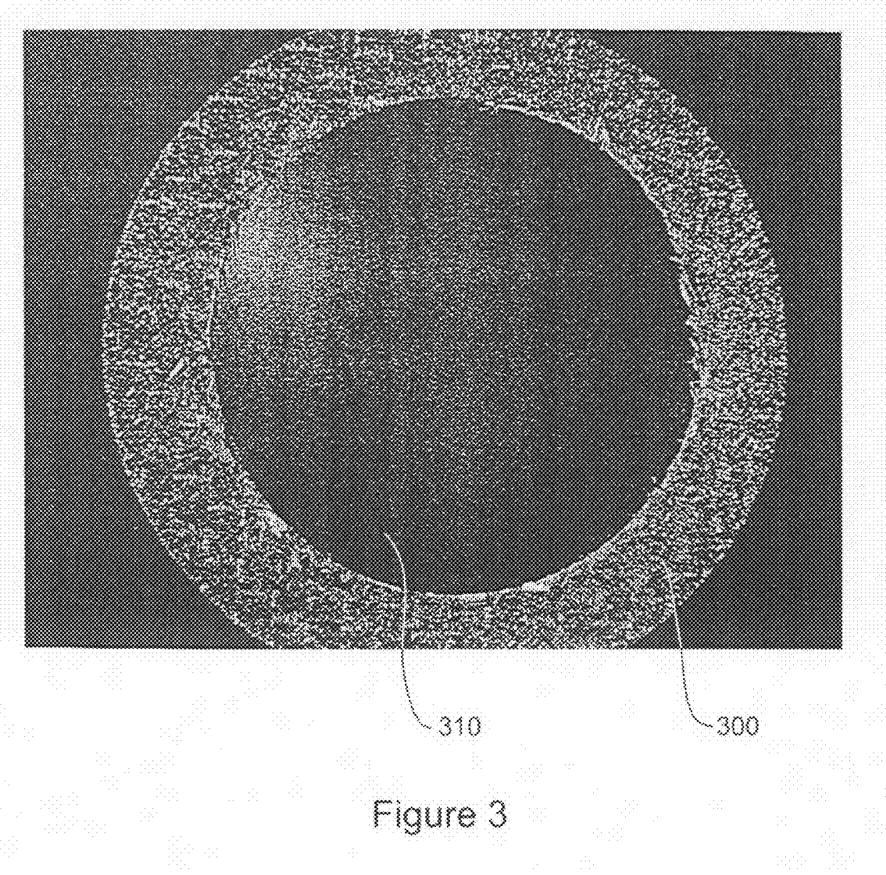
FIG. 3 is a photograph of an exit hole produced in a carbon fiber reinforced plastic composite laminate material using the drill bit configuration and methods of the present invention after previously producing 100 holes.

FIG. 3 shows an exit hole 310 produced in the same CFRP laminate used in FIGS. 1 and 2 using a PCD-tipped drill according to the present invention that had previously been used to produce 100 holes. Unlike the holes 110, 210 illustrated in FIGS. 1 and 2, respectively, the hole 310 of FIG. 3 has a very round, uniform shape and is substantially free of uncut fibers.

Figure 4:
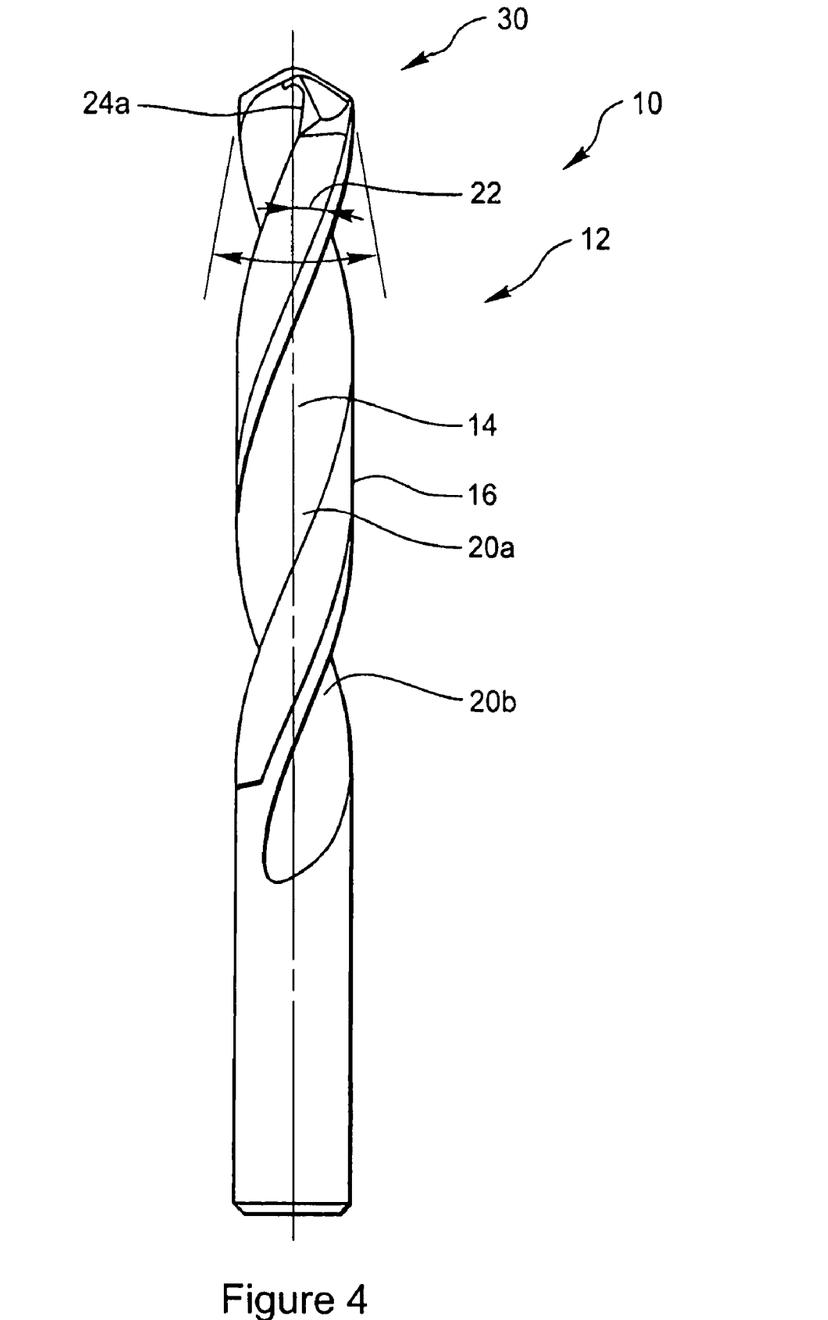
FIG. 4 is a side plan view of a twist drill configuration of the present invention.

The present invention provides drill configurations for producing holes such as that illustrated in FIG. 3 which are substantially free of uncut fibers and matrix material, and are thus ready for immediate use in fastening components together. Referring first to FIG. 4, a side plan view of a twist drill 10 configuration of the present invention is shown. The drill 10 has an elongated cylindrical shaft 12 with a central longitudinal axis 14, and an outside diameter 16. The drill 10 has a pair of symmetrical helical flutes 20a, 20b, traveling a portion of the shaft 12. According to the invention, these helical flutes 20a, 20b are provided having a helix angle 22 ranging from about 5° to about 45° provide most utility within the scope of the present invention. The configuration illustrated in FIG. 4 has a helix angle 22 of about 24°. The flutes 20a, 20b, terminate in a cutting tip 30.

The intersection of the flutes 20a, 20b with the cutting tip 30 of the drill 10 creates an axial rake face equal to the helix angle 22 of the flute 20a, 20b. As noted above, in some embodiments the drills 10 of the invention have helix angles 22 ranging from about 5° to about 45° degrees. Higher helix angles 22 produce a more positive rake face 24a, 24b. Rake faces 24a, 24b with angles higher than 45° may present a more fragile cutting edge, however, and thus render the device prone to chipping. In some conditions, this may correspond with shorter tool life and reduced ability to recondition the tool multiple times. On the other hand, helix angles 22 lower than 5° may generally be more likely to leave uncut fibers, thus reducing the utility of the drills of the invention.

As discussed above, in some circumstances it is desirable to provide a combination twist and countersink/counterbore drill 110, as illustrated in a side plan view in FIG. 5 to produce a hole with the top part enlarged such that a head of a fastener such as a screw, bolt, or other fastener will lie flush with or below the surface. Alternatively, a hole may be produced with a flat-bottomed cylindrical enlargement of the mouth of a hole by providing a drill 110 with a counterbore. Such a hole may be useful to receive a larger fastener such as one with a cylindrical screw head. As with the drill 10 of FIG. 4, the drill 110 of FIG. 5 has an elongated cylindrical shaft 112 with a central longitudinal axis 114. The drill 110 includes a first outside diameter 116a present at the upper portion of the shaft 112 and a second outside diameter 116b provided on the countersink portion 170 of the drill 110. The drill 110 has a pair of symmetrical helical flutes 120a, 120b which travel a portion of the shaft 112. As above, according to the invention, these helical flutes 120a, 120b are provided having a helix angle 122 ranging from about 5° to about 45° provide most utility within the scope of the present invention. The configuration illustrated in FIG. 5 has a helix angle 122 of about 24°. The flutes 120a, 120b, terminate in a cutting tip 130. The cutting tip 130 of the drill 110 of FIG. 5 is identical to the cutting tip of FIG. 4.

The intersection of the flutes 120a, 120b with the cutting tip 130 of the drill 110 creates an axial rake face equal to the helix angle 122 of the flute 120a, 120b. As with the drill 10 of FIG. 4, the combination twist and countersink/counterbore drill 110 of FIG. 5 includes helix angles 122 ranging from about 5° to about 45° degrees. Higher helix angles 122 produce a more positive rake face 124a, 124b. Rake faces 124a, 124b with angles higher than 45° may present a more fragile cutting edge, however, and thus render the device prone to chipping. In some conditions, this may correspond with shorter tool life and reduced ability to recondition the tool multiple times. On the other hand, lower helix angles 122 than 5° may generally be more likely to leave uncut fibers, thus reducing the utility of the drills of the invention.

Figure 5:
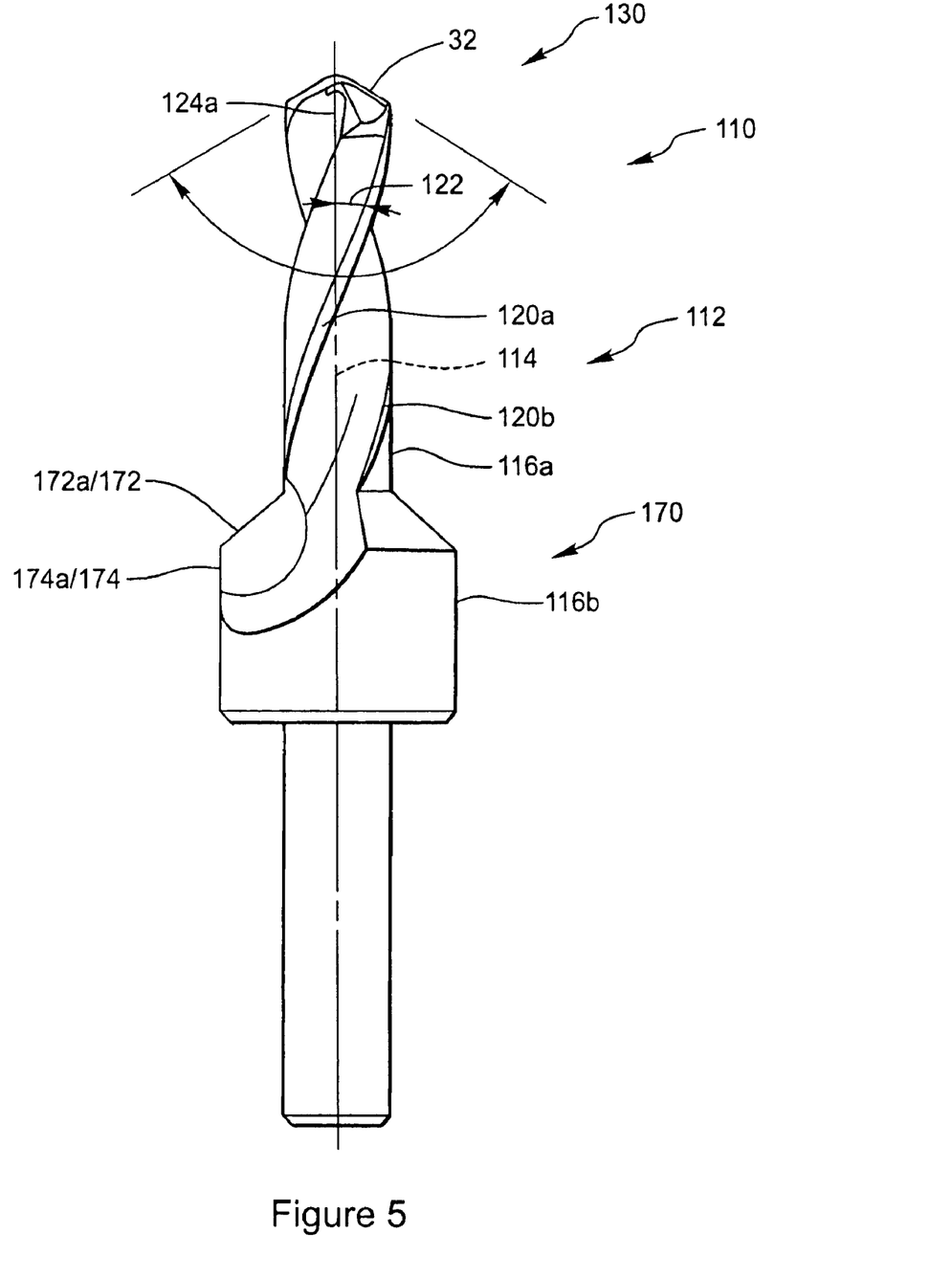
FIG. 5 is a side plan view of a combination twist drill and countersink configuration of the present invention.

The drill 110 of FIG. 5 includes a countersink portion 170. Such a drill 110 will be useful when the hole to be produced by the drill 110 requires a countersinked top surface. The drill 110 is illustrated to include a PCD countersink 170 that is added on either one or both flutes 120a, 120b depending upon the relative life of the cutting tip 130 as compared to the countersink area 170 of the drill 110. For drills 110 to be used to produce deep holes with a shallow countersink, a single countersink 172a provides sufficient tool life. The countersink 172 may have a PCD edge 174 to further prolong the life of the tool. In a drill used to most commonly produce shallow holes, two countersinks may be optimum. For clarity, only one of the countersinks, namely countersink 172a, is shown in FIG. 5. This countersink 172a is added to the flute 120a. A symmetric countersink may also be added to the flute 120b, as will be appreciated by a skilled artisan. The countersink added to the flute 120b would be symmetrical/identical to the countersink 172a, if the drill 110 were viewed from the opposite side. Each countersink may include a PCD edge. In FIG. 5, only the PCD edge 174a is illustrated. The combination of the two cutting activities, i.e., drilling and countersinking, may save time and improve the accuracy of the countersink produced to the centerline of the drilled hole.

Figure 6:
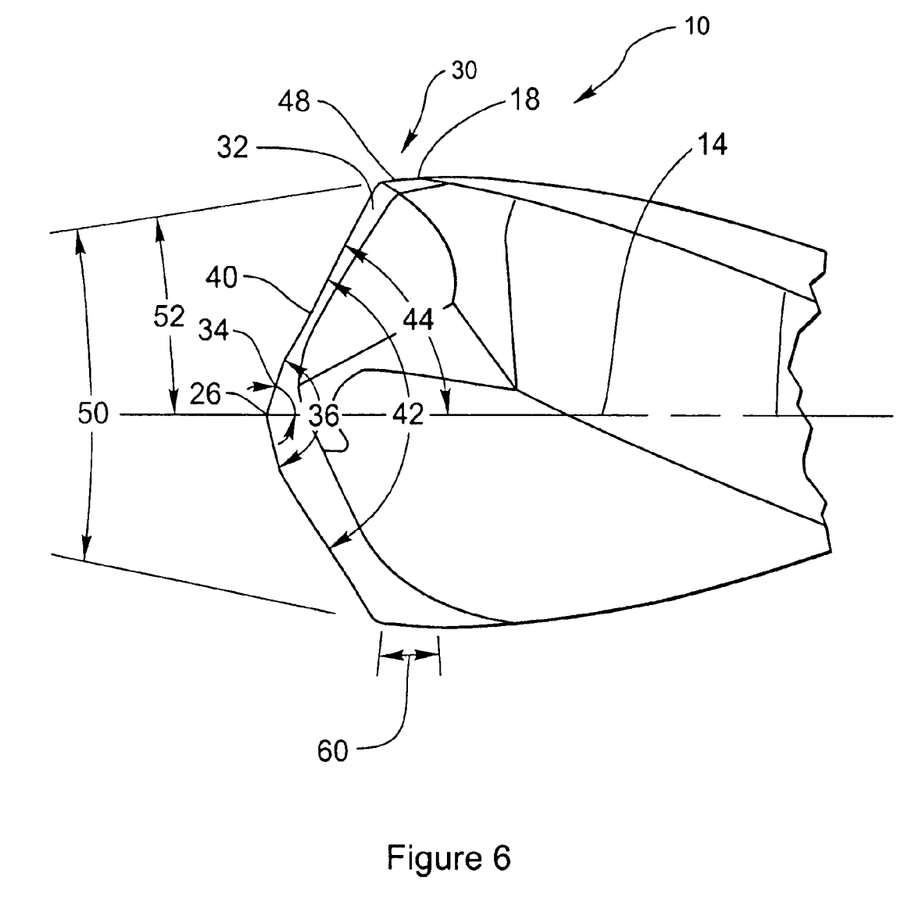
FIG. 6 is a partial side plan view of the tip of the twist drills of the present invention illustrating the point geometry of the twist drill.

Referring next to FIG. 6, a partial side plan view of the cutting tip 30 of the twist drills 10 of the present invention is provided. It is to be understood hereafter that descriptions of the cutting tip 30 also pertain to the cutting tip 130 of combination twist and countersink drill 110 of FIG. 5 which may be produced in a manner identical to the drill 10 of FIG. 4 with the exception that a countersink or counterbore may be added. For clarity, reference will be made to cutting tip 30 of FIG. 4, while implicitly including cutting tip 130 of FIG. 5.

FIG. 6 illustrates the unique point geometry of the twist drills 10 of the invention. The unique point geometry of the drills 10 of the invention provides a shearing action at the outer edge 18 of the drill 10. As illustrated in FIG. 6, the cutting tip 30 includes a point 26, positioned at the longitudinal axis 14 of the drill 10. The tip 30 further includes at least a single pair of symmetrical primary cutting lips 40 extending from the longitudinal axis 14 toward the outside diameter 16. In addition, the drills 10 of the invention include a symmetrical pair of shear cutting lips 48 extending from the primary cutting lips 40 to the outside diameter 16.

The shear cutting lips 48 are provided at the outside diameter 16 of the drills 10 of the invention to clean the other edge of the hole made in the composite laminate as the drill 10 exits from the hole. The more acute the angle 50 included between the paired shear cutting lips 48, the better the shearing action that is provided at the edges of the drill 10. Decreasing this angle 50 elongates the cutting tip 30 of the drill 10, thus potentially rendering the drill 10 both more expensive to manufacture and less robust. Included angles 50 of less than or equal to about 30° are considered within the scope of the invention. In some specific embodiments of the drills 10 of the invention, the included angle 50 may be less than or equal to about 20° to provide the best balance between the strength of the cutting tip 30 and the performance of the drill 10. The placement of the shear cutting lips 48 may also be characterized by the angle 52 between the shear cutting lip 48 and the central axis 14. In embodiments of the invention, this angle 52 is contemplated to be less than or equal to about 15°. In others, it is contemplated to be less than or equal to about 10°.

The shear cutting lips 48 are also characterized by a longitudinal length 60. It has been determined by the applicants that without regard to the outer diameter 16 of the drill 10, the length 60 of the shear cutting lips 48 is greater than or equal to about 0.020 inches.

The cutting tip 30 also includes a symmetrical pair of primary cutting lips 40. These cutting lips 40 originate from a point at or near the point 26 and travel toward the outside diameter 16 of the drill 10 until they intersect with the shear cutting lips 48. According to the present invention, the primary cutting lip included angle 42 is generally less than or equal to about 150° and greater than or equal to about 90°. In some specific configurations, the primary cutting lip included angle is 118°. As with the angle 50 of the shear cutting lips 48 above, this may also be expressed in terms of the relationship of a single primary cutting lip 48 relative to the longitudinal axis 14 of the drill 10. This partial included angle 44 is generally less than or equal to about 75° and greater than or equal to about 45°. In specific embodiments, this angle may be 59°. A larger point angle 42, 44 pushes less material out in front of the drill 10 but reduces engagement of the drilling tip 30 in the material. Reduction of engagement with the material may reduce the accuracy of the drill 10 as it travels through the material. Use of steeper angles, 42, 44 however, requires a much larger PCD area 32 in the tip 30 of the drill 10, thus making the drill 10 more expensive to manufacture and less robust.

Figure 7:
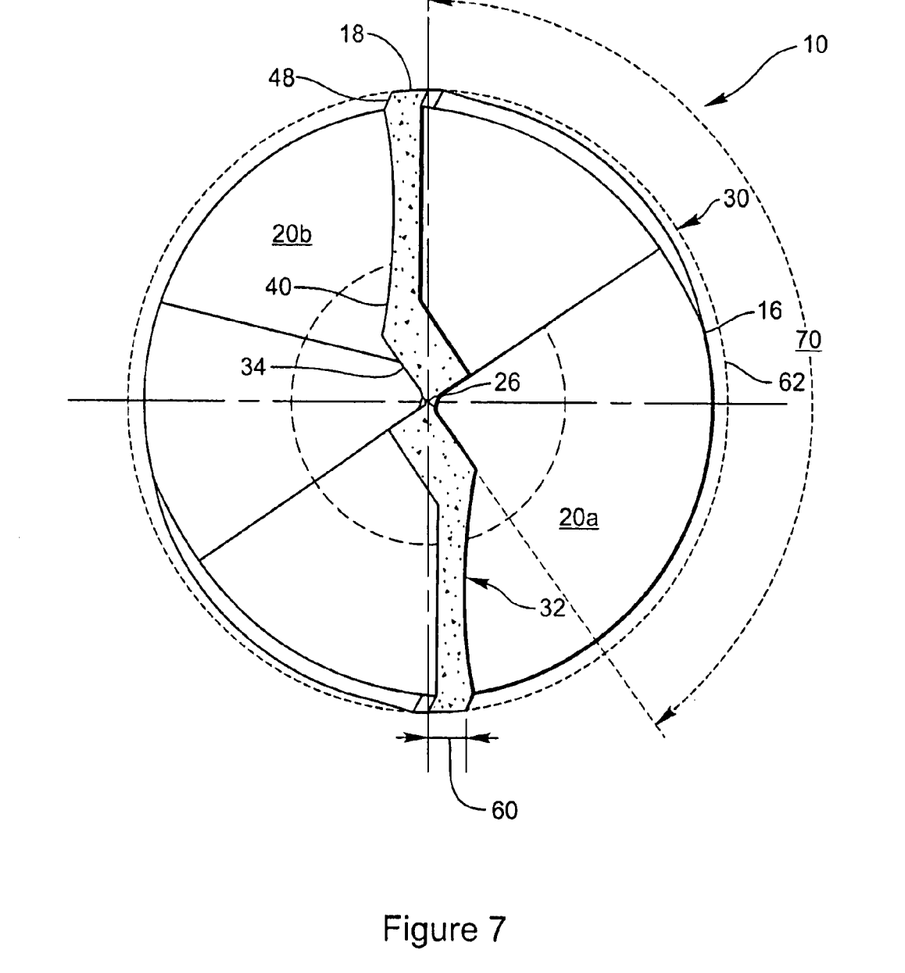
FIG. 7 is an end view of the tip of the twist drills provided according to the present invention.
Figure 8:
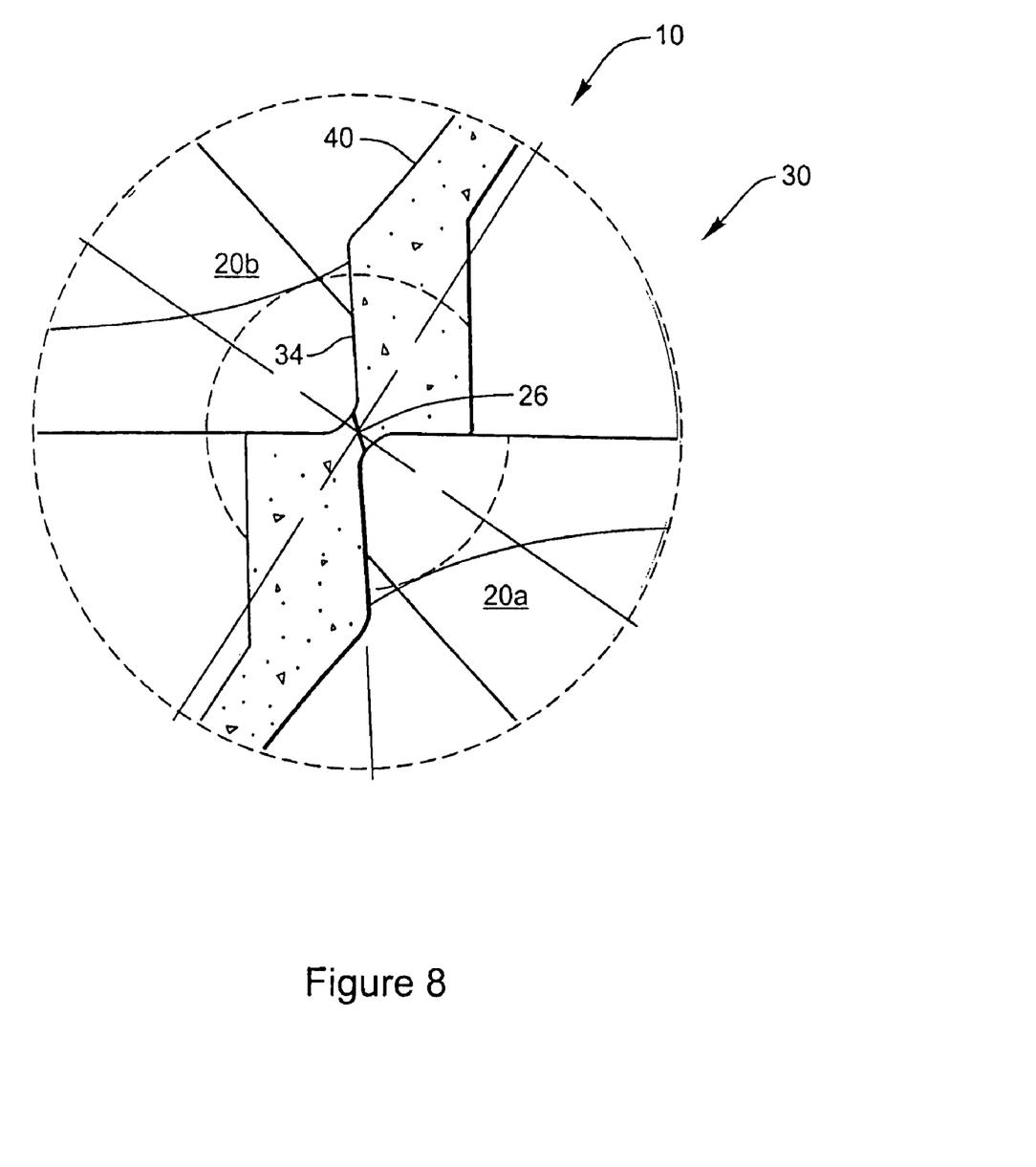
FIG. 8 is a detailed end view of the tip of the twist drill of FIG. 7.

Referring next to FIG. 7, an end view of the tip of the twist drills 10 according to the present invention is provided. As illustrated, in some embodiments of the invention, the drill 10 may further include a cutting tip 30 in which the point 26 is composed of a symmetrical pair of central cutting lips 34 extending away from the point 26 to intersect with the primary cutting lips 40. These central cutting lips 34 are shown in detail in FIG. 8. This geometry is not essential for the present invention but may be included. In some instances, the inclusion of such a split point geometry may greatly reduce the thrust of the drill 10 during use. This may allow for higher penetration rates without damaging the composite laminates. This, in turn, may add to the utility of the invention. A conventional chisel point known and used by those of ordinary skill in the art may also be positioned at the center of the drill 10 within the scope of this invention.

As illustrated in FIG. 4, according to the present invention, the central cutting lip included angle 36 is similar to that of the primary cutting lips 40 discussed above. This included angle 36 may additionally be influenced by the split angle 70. According to the invention, this split angle 70 is generally from about 130° to about 160°. In others, the split angle 70 is about 147°.

Since the value of the central lip included angle 36 is similar to that of the primary cutting lips 40. Thus, the included angle 36 is generally from about 90° to about 150°. In some specific embodiments, the included angle 36 is 118°. As with the angle 50 of the shear cutting lips 48 above, this may also be expressed in terms of the relationship of a single central cutting lip 34 relative to the longitudinal axis 14 of the drill 10. This central included angle 38 is generally less than or equal to about 75° and greater than or equal to about 45°. In specific embodiments, this angle may be 59°.

The invention is further defined by longitudinal shear cutting lip length 60 shown in FIGS. 6 and 7 and the outer diameter 16 of the drill 10. The longitudinal shear cutting lip length 60 is the length of the symmetrical shear cutting lips 48 of the drill 10. This length 60 must be of a sufficient size to affect the proper cutting of the fibers as the drill 10 exits the composite laminate and is dependent on included angle 50. As the included angle 50 is decreased, i.e., becomes more acute, the length 60 must also increase. This characteristic of the invention is best determined by the ratio of two diameters, the drill diameter 16 shown in FIG. 4 and the shear cutting lip diameter 62 of the symmetrical shear cutting lips 48 shown in FIG. 7. In some embodiments of the drills 10 of the present invention, the diameter 62 of the symmetrical shear cutting lips 48 is at least 80% of the drill outside diameter 16 but less than 98%. As the shear cutting lips diameter 62 decreases, the overall height of the cutting structure at the drill point 30 increases. This generally makes the drill 10 more expensive to manufacture without adding significant benefit to the hole quality or the life of the drill 10. Further, as the shear cutting lip diameter 62 increases, cutting length 60 of the symmetrical shear cutting edges 48 decreases and the shearing action of these edges becomes less effective. The diameter 16 may be selected to be 90% of drill diameter 62.

It has additionally been discovered, however, that the longitudinal length 60 of the shear cutting lip should not be less than about 0.020 inches without regard to drill diameter. Larger shear cutting lip lengths 60 may be provided within the scope of the invention. Values substantially less than about 0.020 inches may result in uncut fibers and decrease the efficacy of the drills of the invention.

Figure 9:
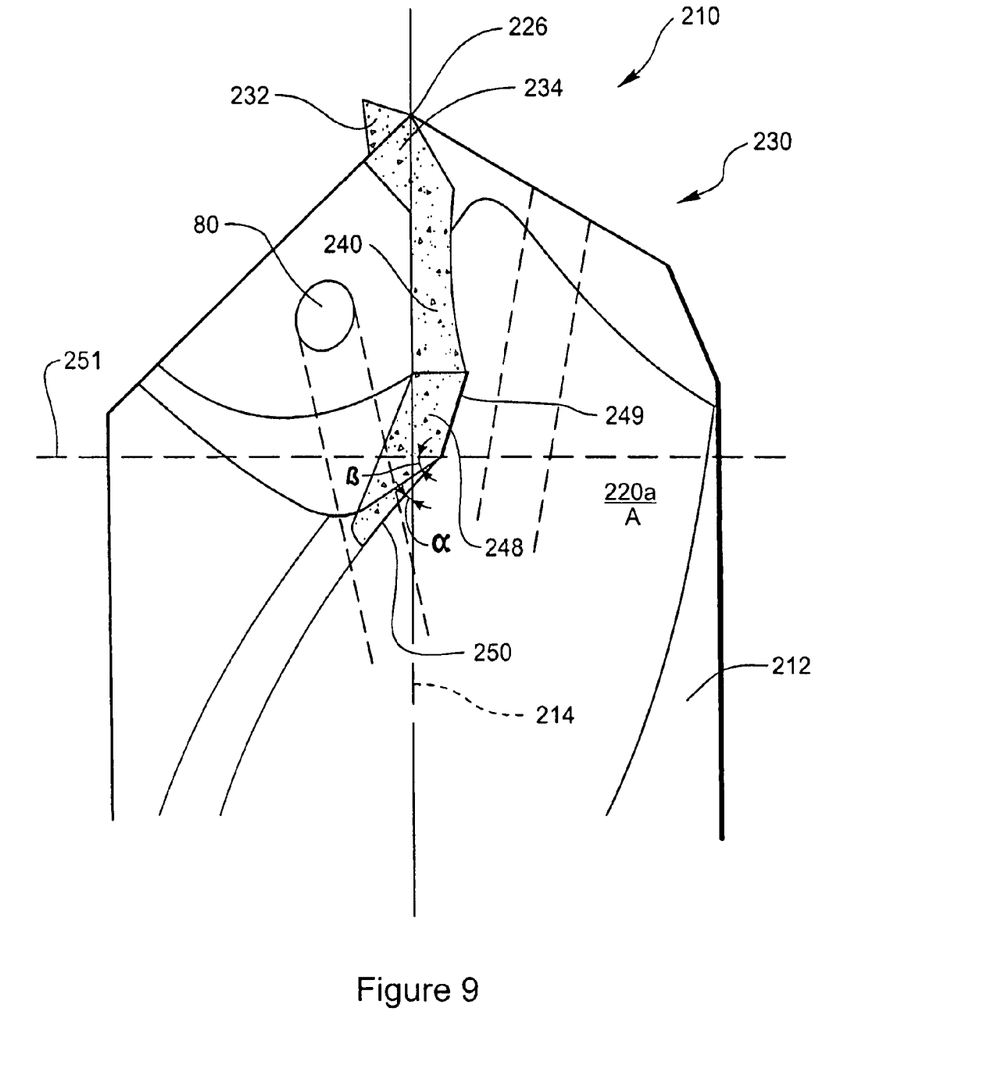
FIG. 9 is a partial perspective view of the tip of an alternate embodiment of the twist drills of the present invention.

FIG. 9 provides a perspective illustration of yet another embodiment of the twist drills 210 according to the present invention. The drill 210 has an elongated cylindrical shaft 212 with a central longitudinal axis 214, and an outside diameter 16. (The outside diameter 16 is not shown in FIG. 9.) As above, the drill 210 has a pair of symmetrical helical flutes. For clarity, only one of the symmetrical helical flutes, flute 220a is shown in FIG. 9. However, the other flute is symmetrical to the flute 220a, as will be appreciated by those skilled in the art. The symmetrical helical flutes travel a portion of the shaft 212. The flutes terminate in a cutting tip 230. The cutting tip 230 includes a PCD portion 232 and a point 226. In addition to the features shared with the drills 10, 110 described earlier, drill 210 further includes at least one coolant channel 280.

FIG. 9 also shows a shear cutting lip 249 that extends from a primary cutting lip 240. The shear cutting lip 249 extends to the outer diameter of the drill body. The shear cutting lip 249 being formed at the intersection of a rake face 250 and a relief face 248. The relief face 248 has a positive relief face angle β with respect to a latitudinal axis 251. There is also a positive rake face angle α that is measured with respect to the longitudinal axis 214. Such a configuration means that the shear cutting lip 249 has a positive rake face angle intersecting with a positive primary relief angle to create a sharp shearing edge. The sheer cutting lip 249 is also oriented at an angle of less than or equal to about 15° relative to the longitudinal axis of the drill body to create a sharp shearing edge.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A drill for producing holes in composite materials comprising:
    an elongate, tungsten carbide drill body including a helical flute and a polycrystalline diamond cutting tip, the cutting tip further comprising:
        a center point coaxial with a longitudinal axis of the drill body;
        a primary cutting lip extending from the center point toward an outer diameter of the drill body, the primary cutting lip extends from the center point toward the outer diameter at an angle of from about 45° to about 75° relative to the longitudinal axis of the drill body; and
        a shear cutting lip extending from the primary cutting lip to the outer diameter of the drill body, the shear cutting lip having a positive rake face angle intersecting with a positive primary relief angle and being oriented at an angle of less than or equal to about 15° relative to the longitudinal axis of the drill body to create a sharp shearing edge.

2. The drill of claim 1, wherein the helical flute has a helix angle of from about 5° to about 45° relative to the longitudinal axis of the drill body.

3. The drill of claim 2, wherein the helical flute has a helix angle of 24° relative to the longitudinal axis of the drill body.

4. The drill of claim 1, wherein the center point comprises:
    a contact point at the surface of the drill; and
    a central cutting lip extending from the center point and intersecting with the primary cutting lip.

5. The drill of claim 1 including two symmetrical helical flutes.

6. The drill of claim 5, wherein the primary cutting lips of the helical flutes are defined by a split angle of from about 130° to about 160°.

7. The drill of claim 6, wherein the primary cutting lips of the helical flutes are defined by a split angle of about 147°.

8. The drill of claim 1, wherein the shear cutting lips have a longitudinal length of greater than or equal to about 0.020 inches.

9. The drill of claim 8, wherein the shear cutting lips have a longitudinal length of about 0.020 inches.

10. The drill of claim 1, wherein the primary cutting lip extends from the center point toward the outer diameter at an angle of from about 55° to about 65° relative to the longitudinal axis of the drill body.

11. The drill of claim 10, wherein the primary cutting lip extends from the center point toward the outer diameter at an angle of about 59° relative to the longitudinal axis of the drill body.

12. The drill of claim 1, wherein the shear cutting lip is oriented at an angle of less than about 15° relative to the longitudinal axis of the drill body.

13. The drill of claim 12, wherein the shear cutting lip is oriented at an angle of less than or equal to about 10° relative to the longitudinal axis of the drill body.

14. The drill of claim 12, wherein the shear cutting lip is oriented at an angle of about 10° relative to the longitudinal axis of the drill body.

15. The drill of claim 1, wherein the helical flute further comprises a countersink.

16. The drill of claim 1, wherein the helical flute further comprises a counterbore.

17. A drill for producing holes in composite materials comprising:
an elongate, tungsten carbide drill body including a pair of symmetrical helical flutes and a polycrystalline diamond cutting tip, wherein the cutting tip comprises:
a center point coaxial with a longitudinal axis of the drill body;
a pair of primary cutting lips extending from the center point toward an outer diameter of the drill body, the primary cutting lip extends from the center point toward the outer diameter at an angle of from about 45° to about 75° relative to the longitudinal axis of the drill body; and
a pair of symmetrical shear cutting lips having a positive rake face angle intersecting with a positive primary relief angle and being oriented at an angle of less than or equal to about 15° relative to the longitudinal axis of the drill body to create a sharp shearing edge.

18. The drill of claim 17, wherein the pair of symmetrical helical flutes has a helix angle of from about 5° to about 45° relative to the longitudinal axis of the drill body.

19. The drill of claim 18, wherein the pair of symmetrical helical flutes has a helix angle of 24° relative to the longitudinal axis of the drill body.

20. The drill of claim 17, wherein the center point comprises a contact point produced by the intersection of a pair of symmetrical central cutting lips that each extend from the longitudinal axis of the drill body to intersect with the primary cutting lips.

21. The drill of claim 20, wherein the primary cutting lips are defined by a split angle of from about 130° to about 160°.

22. The drill of claim 21, wherein the primary cutting lips are defined by a split angle of about 147°.

23. The drill of claim 17, wherein the shear cutting lips have a longitudinal length of greater than or equal to about 0.020 inches.

24. The drill of claim 23, wherein the shear cutting lips have a longitudinal length of about 0.020 inches.

25. The drill of claim 19, wherein the pair of primary cutting lips extends from the center point toward the outer diameter at an angle of about 59° relative to the longitudinal axis of the drill body.

26. The drill of claim 17, wherein the pair of symmetrical shear cutting lips is oriented at an angle of less than or equal to about 10° relative to the longitudinal axis of the drill body.

27. The drill of claim 26, wherein the pair of symmetrical shear cutting lips is oriented at an angle of about 10° relative to the longitudinal axis of the drill body.

28. The drill of claim 17, wherein one of the symmetrical helical flutes further comprises a countersink.

29. The drill of claim 28, wherein each of the symmetrical helical flutes further comprises a countersink.

30. The drill of claim 17, wherein one of the symmetrical helical flutes further comprises a counterbore.

31. The drill of claim 30, wherein each of the symmetrical helical flutes further comprises a counterbore.

32. A drill for producing holes in composite materials comprising:
an elongate, tungsten carbide drill body including a pair of symmetrical helical flutes and a polycrystalline diamond cutting tip, wherein the cutting tip comprises:
a center point coaxial with a longitudinal axis of the drill body formed by the intersection of a pair of symmetrical central cutting lips extending from the longitudinal axis toward an outer diameter of the drill body at an angle of from about 45° to about 75° relative to the longitudinal axis;
a pair of primary cutting lips extending from the central cutting lips toward an outer diameter of the drill body at an angle of from about 45° to about 75° relative to the longitudinal axis; and
a pair of symmetrical shear cutting lips extending from the primary cutting lips to the outer diameter, each of the lips having a positive rake face angle intersecting with a positive primary relief angle and being oriented at an angle of less than about 15° relative to the longitudinal axis of the drill body to create a sharp shearing edge.

33. The drill of claim 32, wherein the pair of symmetrical shear cutting lips is oriented at an angle of about 10° relative to the longitudinal axis of the drill body.

34. The drill of claim 32, wherein a longitudinal length of the symmetrical shear cutting lips is about 0.020 inches.

35. The drill of claim 32, wherein at least one helical flute further comprises a polycrystalline diamond countersink.

36. The drill of claim 1, wherein the primary cutting lip extends from the center point toward the outer diameter at an angle of from about 45° to about 65° relative to the longitudinal axis of the drill body.

* * * * *